United States Patent
Aicher et al.

(10) Patent No.: US 12,046,896 B2
(45) Date of Patent: Jul. 23, 2024

(54) DUAL-VOLTAGE DC POWER SUPPLY

(71) Applicant: BRP-ROTAX GMBH & CO. KG, Gunskirchen (AT)

(72) Inventors: Michael Aicher, Linz (AT); Mario Zanghellini, Vorchdorf (AT); Manfred Moeseneder, Gunskirchen (AT); Michael Dopona, Bad Hall (AT); Alexander Schrempf, Gmunden (AT); Matthias Weinzierl, Starnberg (AT)

(73) Assignee: BRP-ROTAX GMBH & CO. KG, Gunskirchen (AT)

( * ) Notice: Subject to any disclaimer, the term of this patent is extended or adjusted under 35 U.S.C. 154(b) by 0 days.

(21) Appl. No.: 18/259,466

(22) PCT Filed: Dec. 20, 2021

(86) PCT No.: PCT/EP2021/086898
§ 371 (c)(1),
(2) Date: Jun. 27, 2023

(87) PCT Pub. No.: WO2022/144221
PCT Pub. Date: Jul. 7, 2022

(65) Prior Publication Data
US 2023/0396061 A1    Dec. 7, 2023

Related U.S. Application Data

(60) Provisional application No. 63/131,052, filed on Dec. 28, 2020.

(51) Int. Cl.
*H02J 1/08*    (2006.01)
*H02J 1/00*    (2006.01)
(Continued)

(52) U.S. Cl.
CPC .............. *H02J 1/082* (2020.01); *H02J 1/002* (2020.01); *H02J 1/12* (2013.01); *H02J 9/061* (2013.01); *H02J 2310/44* (2020.01)

(58) Field of Classification Search
CPC .... H02J 1/082; H02J 1/002; H02J 1/12; H02J 9/061; H02J 2310/44
See application file for complete search history.

(56) References Cited

U.S. PATENT DOCUMENTS

| 5,864,221 A | 1/1999 | Downs et al. |
| 9,973,097 B2 | 5/2018 | Wambsganss |

(Continued)

FOREIGN PATENT DOCUMENTS

| CN | 105471281 A | 4/2016 |
| CN | 205265547 U | 5/2016 |

(Continued)

OTHER PUBLICATIONS

International Search Report of PCT/EP2021/086898 isssued from ISA/EP; Bernard Chaumeron; Apr. 22, 2022.

*Primary Examiner* — Daniel Cavallari
(74) *Attorney, Agent, or Firm* — BCF LLP (57) ABSTRACT

A power supply comprises a DC power source, first and second DC/DC converters, and a protection circuit. The DC power source provides DC power at a variable bulk voltage. The first DC/DC converter converts the DC power from the DC power source to DC power at a high voltage suitable for powering a high-voltage load. The second DC/DC converter receives DC power from the first DC/DC converter, converts the received DC power to DC power at a low voltage, and delivers the DC power at the low voltage to a low-voltage load. The protection circuit selectively transfers DC power from the first DC/DC converter to the high-voltage load. The (Continued)

DC power source may be an AC/DC converter receiving AC power from a power generator driven by an aircraft engine.

20 Claims, 9 Drawing Sheets

(51) Int. Cl.
  *H02J 1/12* (2006.01)
  *H02J 9/06* (2006.01)

(56) References Cited

U.S. PATENT DOCUMENTS

| | | |
|---|---|---|
| 10,110,016 B2 | 10/2018 | Casimir et al. |
| 10,141,829 B2 | 11/2018 | Fullmer et al. |
| 2019/0267833 A1 | 8/2019 | Collins et al. |

FOREIGN PATENT DOCUMENTS

| | | |
|---|---|---|
| CN | 106208256 B | 3/2019 |
| CN | 110915123 A | 3/2020 |

DUAL-VOLTAGE DC POWER SUPPLY

CROSS-REFERENCE

The present application claims priority from U.S. Provisional Patent Application Ser. No. 63/131,052, filed on Dec. 28, 2020, the disclosure of which is incorporated by reference herein in its entirety.

FIELD OF TECHNOLOGY

The present technology relates to a power supply providing DC power at two distinct voltages.

BACKGROUND

The European Aviation Safety Agency (EASA) has defined a certification specification CS-23 applicable to small, single engine aircraft. These aircraft generally include two separate DC electrical systems. One electrical system is a low-voltage electrical system providing power to a low-voltage load including an engine management system (EMS) for controlling the aircraft engine. Another electrical system is a high-voltage electrical system providing power to a high-voltage load including various aircraft electrical systems within the aircraft, for example for lighting and ventilation apparatuses, landing gear motor, and the like. In this context, the low-voltage electrical system may for example have a 12V nominal voltage and the high-voltage electrical system may for example have a 24V nominal voltage.

Conventionally, the two distinct AC power generators are driven by the aircraft engine. Distinct AC/DC converters are fed AC power from the AC power generators; one AC/DC converter provides DC power to the high-voltage load while the other AC/DC converter provides DC power to the low-voltage load. Should one of the AC power generators fail, delivery of power at the low voltage to the EMS is prioritized for safety reasons and delivery of power to the high-voltage load may cease.

It would be desirable to maintain delivery of power to the high-voltage load when one of the AC power generators fails. A simple solution consisting of doubling all AC/DC power conversion systems would be costly and add weight to the aircraft.

In view of the foregoing, there is a need for improvements in AC/DC power conversion systems used in light aircrafts.

SUMMARY

It is an object of the present technology to ameliorate at least some of the inconveniences present in the prior art.

According to one aspect of the present technology, there is provided a power supply for use in an aircraft, comprising: a DC power source adapted for providing DC power at a variable bulk voltage; a first DC/DC converter adapted for converting the DC power from the DC power source to DC power at a high voltage suitable for powering a high-voltage load; a second DC/DC converter adapted for receiving DC power from the first DC/DC converter, for converting the received DC power to DC power at a low voltage and for delivering the DC power at the low voltage to a low-voltage load, the low voltage being lower than the high voltage; and a protection circuit adapted for selectively transferring DC power from the first DC/DC converter to the high-voltage load.

In some embodiments of the present technology, the first DC/DC converter is further adapted for converting the DC power from the DC power source to DC power at the high voltage if the variable bulk voltage is at least equal to the high voltage, the output of the first DC/DC converter being substantially equal to the variable bulk voltage if the variable bulk voltage is lower than the high voltage.

In some embodiments of the present technology, the protection circuit is further adapted for preventing transfer of the DC power from the first DC/DC converter to the high-voltage load in response to an error condition selected from an undervoltage of the DC power source, an overvoltage at an output of the first DC/DC converter, an overcurrent in the protection circuit, a high-temperature condition, and a combination thereof.

In some embodiments of the present technology, the power supply further comprises a monitoring circuit operatively connected to the protection circuit, the monitoring circuit being configured for outputting a high-voltage power unavailable indication in response to the error condition.

In some embodiments of the present technology, the monitoring circuit is further operatively connected to the second DC/DC converter; and the monitoring circuit is further configured for detecting that the DC power at the low voltage is unavailable and, in response thereto, outputting a low-voltage power unavailable indication.

In some embodiments of the present technology, the power supply further comprises a start and backup input circuit adapted for receiving DC power from a backup source; and wherein: the second DC/DC converter is further adapted for converting DC power received from the backup source via the start and backup input circuit to DC power at the low voltage; and the protection circuit is further adapted for receiving DC power from the backup source via the start and backup input circuit and for selectively delivering the DC power from the backup source to the high-voltage load.

In some embodiments of the present technology, the power supply further comprises a monitoring circuit operatively connected to the start and backup input circuit, the monitoring circuit being adapted for outputting a backup power indication in response DC power being received from the backup source.

In some embodiments of the present technology, the start and backup input circuit comprises a diode adapted for preventing a return of DC power from the first DC/DC converter to the backup source.

In some embodiments of the present technology, the protection circuit comprises one or more sensors selected from: a temperature sensor adapted for measuring a temperature of the power supply, a first voltage sensor adapted for measuring a voltage provided by the DC power source, a second voltage sensor adapted for measuring a voltage provided by the first DC/DC converter, and a current sensor adapted for measuring a current output by the protection circuit; and the protection circuit further comprises: a switch adapted for selectively transferring the DC power from the first DC/DC converter to the high-voltage load, and a switch controller, operatively connected to the one or more sensors, the switch controller being adapted for declaring an error condition based on one or more signals from the one or more sensors and for causing opening of the switch in response to declaring the error condition; wherein the error condition is selected from: a temperature error condition declared in response to the temperature of the power supply exceeding a high-temperature threshold, an overvoltage error condition declared in response to the voltage provided by the first DC/DC converter exceeding an overvoltage threshold, an undervoltage error condition declared in response to the voltage provided by the DC power source being less than an undervoltage threshold, an overcurrent error condition declared in response to the current output by the protection circuit exceeding a high-current threshold, and a combination thereof.

In some embodiments of the present technology, the protection circuit comprises an internal timer adapted for selectively resetting the error condition at a predetermined time after occurrence of the error condition.

In some embodiments of the present technology, in response to the error condition being the undervoltage error condition, the protection circuit resets the undervoltage error condition in response to the voltage provided by the DC power source being greater than or equal to an undervoltage reset threshold greater than the undervoltage threshold at the predetermined time after the occurrence of the error condition.

In some embodiments of the present technology, in response to the error condition being the temperature error condition, the monitoring circuits resets the temperature error condition in response to the temperature of the power supply being less than or equal to a temperature reset threshold lower than the high-temperature threshold at the predetermined time after the occurrence of the error condition.

In some embodiments of the present technology, the second DC/DC converter comprises a galvanic isolation.

In some embodiments of the present technology, the second DC/DC converter comprises: an internal DC/AC converter adapted for receiving the DC power from the first DC/DC converter and for converting the received DC power to high-frequency AC power; an internal AC/DC converter adapted for converting the high-frequency AC power to the DC power at the low voltage and for delivering the DC power at the low voltage to the low-voltage load; and an internal transformer adapted for transferring the AC power from the internal DC/AC converter to the internal AC/DC converter.

In some embodiments of the present technology, the internal DC/AC converter comprises an inverter operating at a frequency in a range between 100 and 200 KHz.

In some embodiments of the present technology, each of the first and second DC/DC converters is a switching regulator.

In some embodiments of the present technology, the DC power source is a main AC/DC converter internal to the power supply, the main AC/DC converter having an input adapted for receiving AC power from an external power source and an output adapted for delivering the DC power at the variable bulk voltage to the first DC/DC converter.

In some embodiments of the present technology, the main AC/DC converter is a bridge rectifier adapted for receiving a multiphase AC power from the external power source.

In some embodiments of the present technology, the AC power is received from the external power source at a variable voltage.

In some embodiments of the present technology, the main AC/DC converter is adapted for receiving the AC power from a generator driven by an aircraft engine.

In some embodiments of the present technology, the second DC/DC converter is adapted for providing power to an engine management system of the aircraft engine, the engine management system being part of the low-voltage load; and the first DC/DC converter is adapted for providing power aircraft electrical systems being part of the high-voltage load.

In some embodiments of the present technology, the low voltage has a 12-volt nominal value; and the high voltage has a 24-volt nominal value.

Embodiments of the present technology each have at least one of the above-mentioned objects and/or aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects and advantages of embodiments of the present technology will become apparent from the following description, the accompanying drawings and the appended claims.

BRIEF DESCRIPTION OF THE DRAWINGS

For a better understanding of the present technology, as well as other aspects and further features thereof, reference is made to the following description which is to be used in conjunction with the accompanying drawings, where.

DETAILED DESCRIPTION

The present technology will be described with respect to an electrical power system implemented in a CS-23 type light aircraft having a single gas-fueled piston engine and a pair of AC generators driven by the piston engine. However, it is contemplated that the present technology could be applied to other aircraft, for example twin-engine aircraft. Application of the present technology is therefore not intended to be limited to its use in CS-23 aircraft. Additionally, while an intended use of the present technology is to control delivery of DC power to various components of an aircraft, the present technology can also be used for other applications that benefit from dual-voltage DC power delivery.

Figure 1:
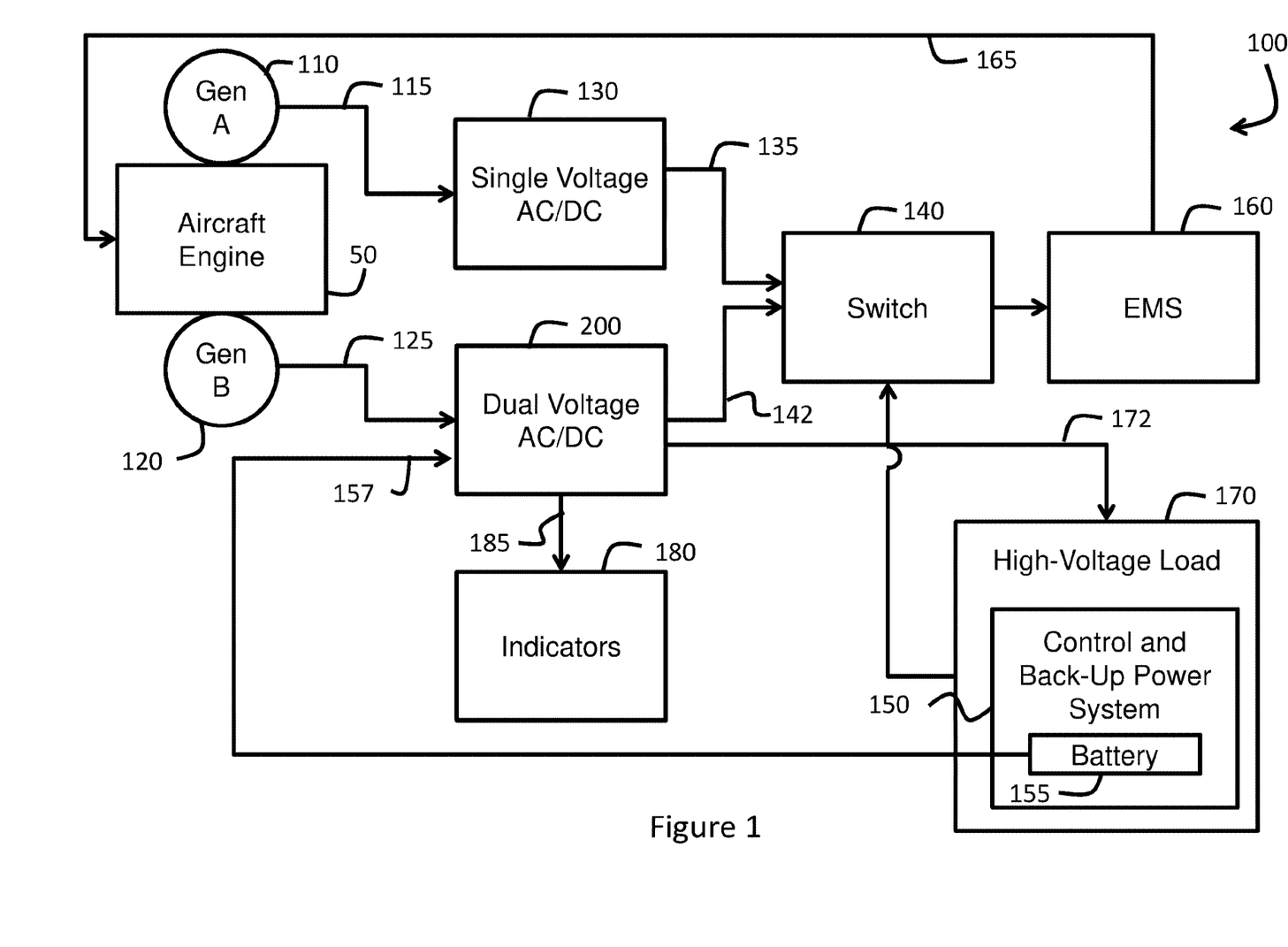
FIG. 1 is a block diagram of an electrical power system of a CS-23 type aircraft in accordance with an embodiment of the present technology.

A block diagram of an electrical power system 100 of a CS-23 type aircraft in accordance with one embodiment of the present technology is shown in FIG. 1. This and other block diagrams presented in the following Figures are simplified for illustration purposes. The electrical power system 100 of the aircraft comprises two complementary AC generators 110 (Gen A) and 120 (Gen B) driven by an aircraft engine 50. In a non-limiting embodiment, the AC generators 110 and 120 output multiphase AC power, for example tri-phase AC power. Voltages at the outputs of the AC generators 110 and 120 may vary greatly according to a rotational speed of the aircraft engine 50.

AC power from the AC generator 110 is applied to a power input 115 of single-voltage AC/DC converter 130 having a power output 135 providing DC power at a low nominal voltage. This low nominal voltage is generally referred to as 12V, but is usually closer to about 14V in normal operation. DC power from the single-voltage AC/DC converter 130 is applied to a switch 140 controlled by a control and back-up power system 150. In normal operation, the switch 140 allows transferring the DC power from the single-voltage AC/DC converter 130 to an electronic management system (EMS) 160 that controls 165 the aircraft engine 50. In particular, the EMS 160 may include an electronic control unit (ECU), a fuel pump, electronic injectors and electronic ignition (all of which are not shown) for operating the aircraft engine 50. While not shown on FIG. 1, the switch 140 may comprise a plurality of fuses for individually directing parts of DC power to the various components of the EMS 160.

AC power from the AC generator 120 is applied to a power input 125 of a dual-voltage AC/DC converter 200 having a power output 142 providing DC power at the low nominal voltage and another power output 172 providing DC power at a high nominal voltage. This high nominal voltage is generally referred to as 24V, but is usually closer to about 28V in normal operation. DC power at the low nominal voltage from the dual-voltage AC/DC converter 200 is applied to the switch 140. When DC power is available from the single-voltage AC/DC converter 130, the switch 140 usually prevents transferring the DC power from the dual-voltage AC/DC converter 200 to the EMS 160. DC power at the high nominal voltage is provided by the dual-voltage AC/DC converter 200 to a high-voltage load 170 that may include a variety of electrical systems of the aircraft such as, for example and without limitation, ventilation and lighting equipment (not shown). The control and back-up power system 150 is part of the high-voltage load 170. The control and back-up power system 150 comprises an internal battery 155 having a 24V nominal voltage. The internal battery 155 is connected at a power input 157 to the dual-voltage AC/DC converter 200. A group of indicators 180, for example an instrument cluster and/or a group of warning light, is connected to a signalling output 185 of the dual-voltage AC/DC converter 200.

For starting the aircraft engine 50, the control and back-up power system 150 causes 24V DC power to be delivered from the internal battery 155 to the dual-voltage AC/DC converter 200 at the power input 157 and, concurrently, causes the switch 140 to allow transferring 14V DC power from the dual-voltage AC/DC converter 200 to the EMS 160. In the EMS 160, the ECU causes starting of the aircraft engine 50, for example by causing a starter (not shown) powered by the internal battery 155 of the control and back-up power system 150 or by an external battery (not shown) to start the aircraft engine 50.

When the aircraft engine 50 is idling, the AC generators 110 and 120 generate an AC power at a sufficient AC voltage for both the single-voltage AC/DC converter 130 and the dual-voltage AC/DC converter 200 to output DC power at or above the low nominal voltage, generally at 14V. At that time, the EMS 160 may measure the voltages at the power output 135 of the single-voltage AC/DC converter 130 and at the power output 142 of the dual-voltage AC/DC converter 200 and act upon the switch 140 to cause 14V DC power be delivered from the single-voltage AC/DC converter 130 to the EMS 160. While the aircraft engine 50 is still idling, the voltage provided by the AC generator 120 to the dual-voltage AC/DC converter 200 may not be sufficient for the dual-voltage AC/DC converter 200 to produce DC power at the high nominal voltage. At that time, depending on design choices in the construction of the control and back-up power system 150, the dual-voltage AC/DC converter 200 may still be connected to internal battery 155 to receive 24V at its power input 157 and output DC power at 24V to power the high-voltage load 170.

Soon thereafter, as the aircraft engine 50 starts rotating at a more rapid rate which is sufficient for taxying, take off and for normal operation of the aircraft, the voltage provided by the AC generator 120 to the dual-voltage AC/DC converter 200 is more than sufficient for the dual-voltage AC/DC converter 200 to produce DC power at the high nominal voltage and to provide DC power from the power output 172 to the high-voltage load 170. The dual-voltage AC/DC converter 200 no longer needs to receive DC power from the internal battery 155 at its power input 157. Optionally, a portion of the DC power provided to the high-voltage load 170 may be used to recharge the internal battery 155.

In the event of a failure of the single-voltage AC/DC converter 130 to output DC power at the low nominal voltage, the control and back-up power system 150 may cause the switch 140 to allow transferring 14V DC power from the power output 142 of the dual-voltage AC/DC converter 200 to the EMS 160. Should the aircraft engine 50 stall, the control and back-up power system 150 may optionally cause the dual-voltage AC/DC converter 200 to transfer 24V DC power from the internal battery 155 to the high-voltage load 170.

Figure 2:
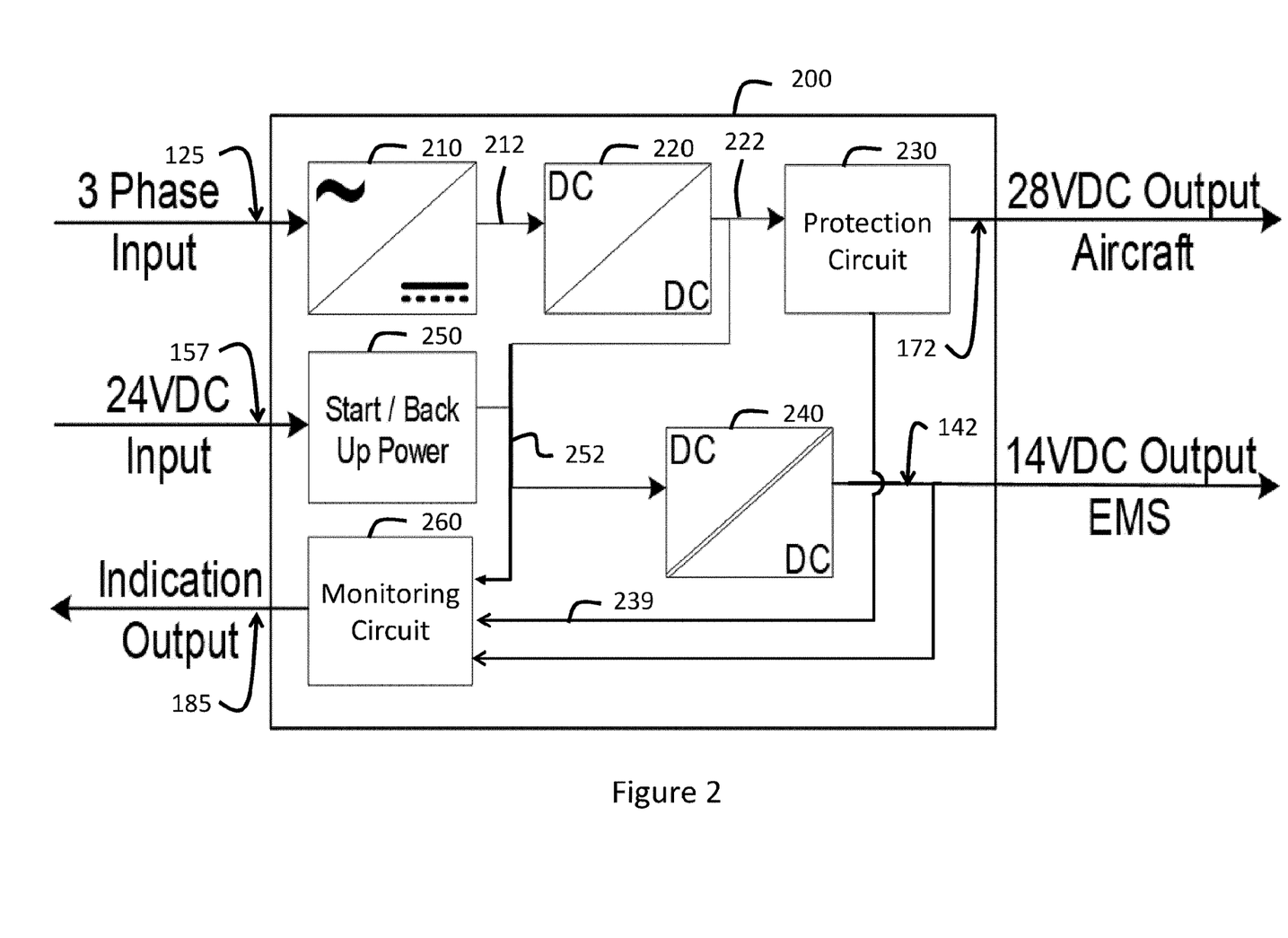
FIG. 2 is a is a block diagram of a dual-voltage AC/DC converter of FIG. 1 in accordance with an embodiment of the present technology.

FIG. 2 is a block diagram of an embodiment of the dual-voltage AC/DC converter 200. The dual-voltage AC/DC converter 200 includes two power inputs 125, 157, two power outputs 172, 142 and an indication output 185. The power input 125 receives AC power, for example tri-phase or multiphase AC power, from the AC generator (Gen B) 120 of FIG. 1. The AC power is applied to a rectifier 210 that acts as a main AC/DC converter that converts the AC power to DC power 212 at a variable bulk voltage. The rectifier 210 may be understood as a DC power source providing DC power at a variable bulk voltage to a first DC/DC converter 220. An instantaneous value of the bulk voltage is about equal to a peak voltage of the AC power applied to the rectifier 210, although a slight voltage drop may take place in components of the rectifier 210. Given that the rotational speed of the aircraft engine 50 may vary considerably, the voltage of the AC power may also vary considerably and, correspondingly, the variable bulk voltage produced by the rectifier may also vary broadly. The bulk voltage may be, for example and without limitation, in a range between 16 and 170 V DC. The bulk voltage is applied to a first DC/DC converter 220, which is capable of converting the DC power 212 at the variable bulk voltage to DC power present at an output 222. The DC power at the output 222 is at the high nominal voltage (nominally 24V, but generally up to about 28V in operation) for powering the high-voltage load 170. The first DC/DC converter 220 may for example be a switching converter. DC power from the first DC/DC converter 220 may or may not be directed to the high-voltage load 170, depending on the state of a protection circuit 230 electrically connected between the first DC/DC converter 220 and the power output 172.

In normal operation, the protection circuit 230 allows delivery of power from the power output 172 of the first DC/DC converter 220 to the high-voltage load 170. However, the protection circuit 230 may prevent delivery of power from the first DC/DC converter 220 to the high-voltage load 170 in the presence of an error condition. To this end, protection circuit 230 may detect one or more error conditions, which are described in detail below. Detection of an error condition may cause the protection circuit 230 to stop delivery of power from the first DC/DC converter 220 to the high-voltage load 170.

The output 222 of the first DC/DC converter 220 is also connected to an input of a second DC/DC converter 240. The second DC/DC converter 240 converts the voltage provided by the first DC/DC converter 220 to the low nominal voltage (nominally 12V, but generally up to about 14 V in operation). In most operating modes of the aircraft engine 50 and of the AC generator (Gen B) 120, including when the aircraft engine 50 is idling, the voltage at the output 222 of the first DC/DC converter 220 is sufficient for the second DC/DC converter 240 to provide the low nominal voltage at the power output 142 for powering the EMS 160 (FIG. 1). The double oblique lines shown in the illustration of the second DC/DC converter 240 indicate that this converter is galvanically isolated, in an embodiment, to fully isolate the power output 142 from any high-voltage component of the electrical power system 100.

The power input 157 of the dual-voltage AC/DC converter 200 is selectively connected to the internal battery 155 of the control and back-up power system 150 (FIG. 1). It may be always connected to the internal battery 155, or may alternatively be connected as directed by the control and back-up power system 150. A start and backup input circuit 250 selectively connects the power input 157 to the protection circuit 230 and to the second DC/DC converter 240 to deliver backup DC power 252 at 24V. Before start-up of the aircraft engine or in case of a loss of power from the AC generator (Gen B) 120, 24V DC power from the internal battery 155 present at the power input 157 may be applied to the second DC/DC converter 240 to generate the 14V power for powering the EMS 160.

When an error condition occurs, the protection circuit 230 may emit an error signal 239 causing a monitoring circuit 260 to emit an indication on the indication output 185 for showing statuses and/or warnings on the group of indicators 180. The monitoring circuit 250 may also detect the presence of backup DC power 252 at the output of the start and backup input circuit 250 and emit another indication on the indication output 185 for showing statuses and/or warnings on the group of indicators 180.

Figure 3:
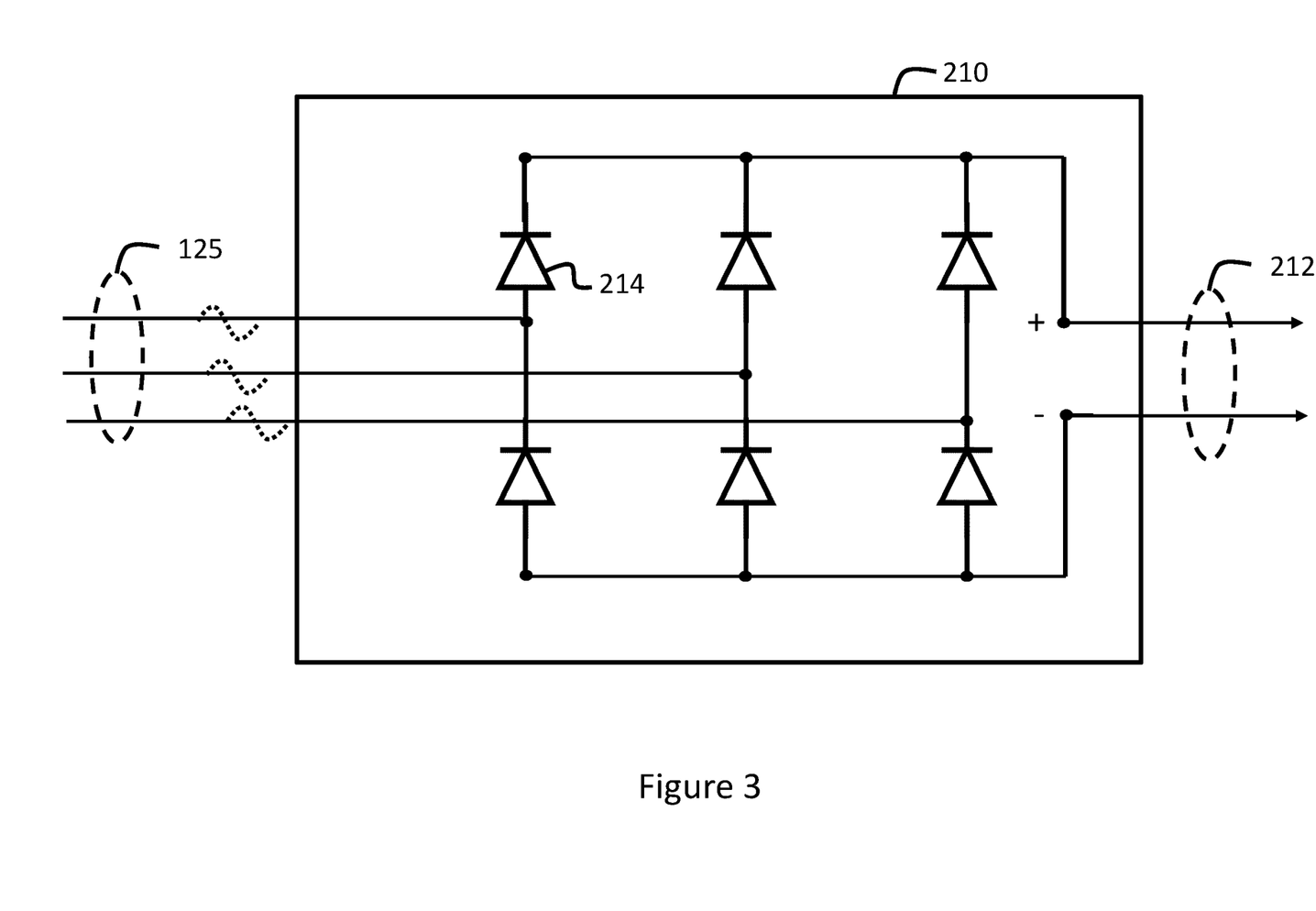
FIG. 3 is a block diagram of a rectifier of the AC/DC converter of FIG. 2 in accordance with an embodiment of the present technology.

FIG. 3 is a simplified block diagram of the rectifier 210. Although illustrated as a single line on FIGS. 1 and 2, the power input 125 may be a multiphase power input, for example and without limitation a tri-phase power input. Likewise, although illustrated as a single line on FIG. 2, the output 212 of the rectifier 210 comprises positive and negative connections. The rectifier 210 in the example of FIG. 3 is a bridge rectifier comprising six diodes 214, which may be, for example and without limitation MBRB40250TG Switch-mode power rectifier Schottky diodes from ON Semiconductor™ or any suitable equivalent diode. A pair of diodes being used to convert the AC voltage from each of three phases of the AC power received at the input 125 into DC power at a bulk voltage at the output 212. The bulk voltage present at the output 212 is substantially equivalent to the peak of the AC voltage at the power input 125, although a slight voltage drop may occur as current flows through the diodes 214. In an embodiment, the rectifier 210 may include more components, for example and without limitation one of more capacitors (not shown) used to minimize variations of the bulk voltage at the output 212.

Figure 4:
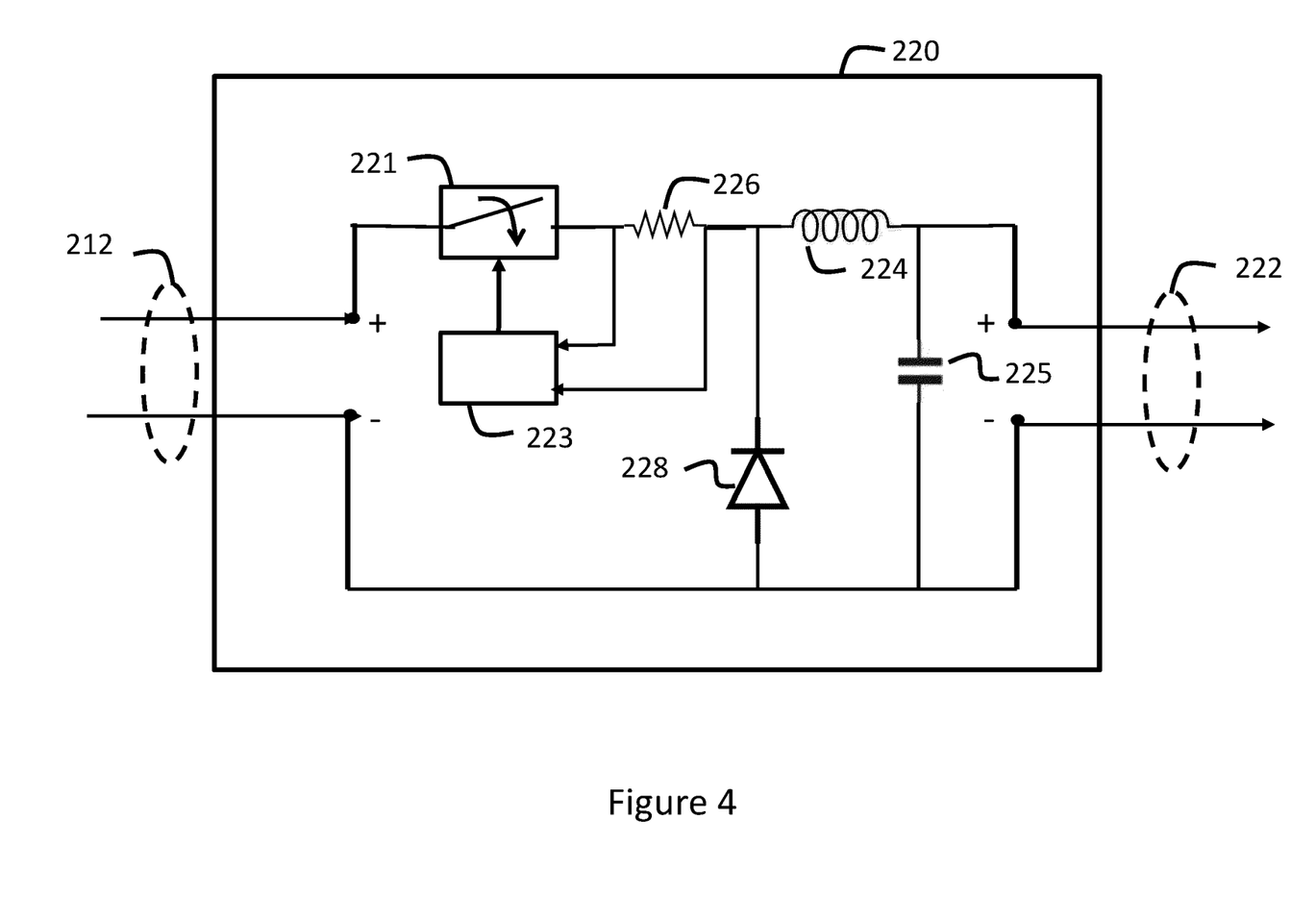
FIG. 4 is a block diagram of a first DC/DC converter of the AC/DC converter of FIG. 2 in accordance with an embodiment of the present technology.

FIG. 4 is a simplified block diagram of the first DC/DC converter 220. Although illustrated as single lines on FIG. 2, the output 212 of the rectifier 210 and the output 222 of the first DC/DC converter 220 each comprises positive and negative connections. The first DC/DC converter 220 comprises a switch 221, a shunt resistor 226, a controlling integrated circuit 223 and a voltage filter including an inductance 224 and a capacitance 225. In an embodiment, the switch 221 may be implemented as a of MOSFET transistor (not shown). For example and without limitation, the controlling integrated circuit 223 may be a UCC28C43 current mode Pulse Width Modulation (PWM) controller from Texas Instruments™, or any suitable equivalent thereof. The controlling integrated circuit 223 senses a DC voltage across the shunt resistor 226. If the sensed DC voltage is less than or equal to a reference, the controlling integrated circuit 223 causes closing of the switch 221 so that the bulk voltage present at the output 212 of the rectifier 210 is applied to the voltage filter including the inductance 224 and the capacitance 225 to produce a DC voltage at the output 222 of the first DC/DC converter 220 that is substantially equal to the bulk voltage. If the sensed voltage is greater than the reference, the controlling integrated circuit 223 may selectively cause rapid opening and closing of the switch 221 so that the DC voltage at the output 222 remains close to the operating voltage of 28V. In an embodiment, the switch 221 may be opened and closed at a rate of up to 200 KHz. A diode 228 (or another MOSFET transistor polarized to operate as the diode 228) may be used to complete the circuit of FIG. 4 when the switch 221 is open.

Considering the structure of the first DC/DC converter 220, its output 222 is expected to be substantially equal to the variable bulk voltage at the output 212 of the rectifier when the switch 221 is maintained in a closed (conducting) condition for any extended time period, for example when the bulk voltage is less than the high nominal voltage.

Figure 5:
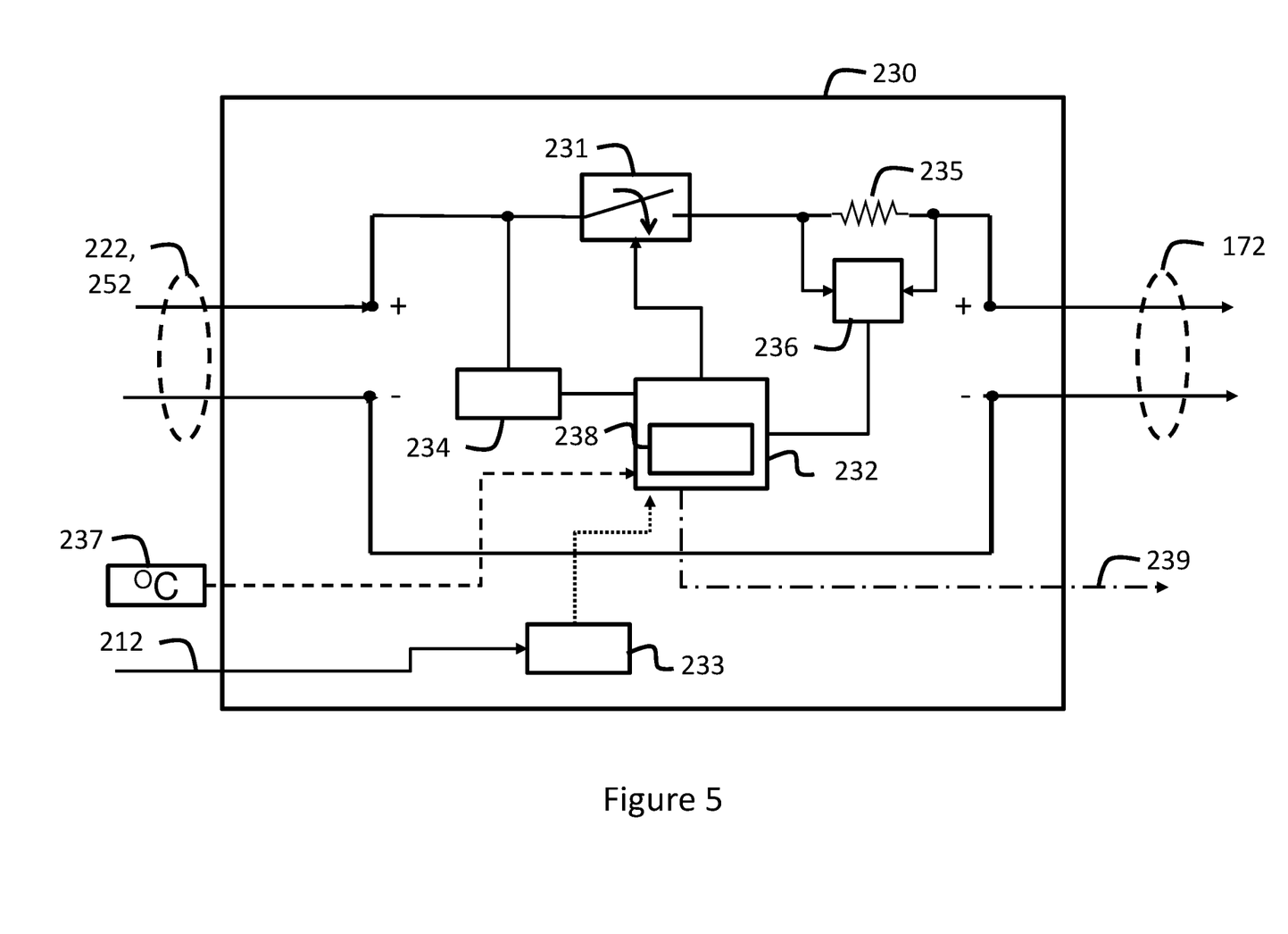
FIG. 5 is a block diagram of a protection circuit of the AC/DC converter of FIG. 2 in accordance with an embodiment of the present technology.

FIG. 5 is a block diagram of the protection circuit 230. The protection circuit 230 receives the DC power from the output 222 of the first DC/DC converter 220 and, in normal operating conditions, transmits the DC power to the high-voltage load 170 (FIG. 1) via the power output 172. To this end a switch 231, which may for example comprise a MOSFET transistor, is closed and conducting in normal operation. The protection circuit 230 may detect a number of error conditions that may be reported to a switch controller 232 that may cause opening of the switch 231.

One error condition may be an undervoltage condition detected when a voltage sensor 233 electrically connected to the output 212 of the rectifier 210 detects that the bulk voltage is lower than a predetermined threshold, for example 37.2V. When the bulk voltage is lower than this threshold, the first DC/DC converter 220 may be able to produce some DC power at least at the nominal voltage of 24V, but may not be able to provide sufficient DC power to fulfill the needs of the high-voltage load 170.

Another error condition may be an overvoltage condition detected when another voltage sensor 234 detects that the output voltage of the first DC/DC converter 220 exceeds a predetermined threshold, for example 32.75V.

A further error condition may be an overcurrent condition. A shunt resistor 235 having a low impedance, for example 1.5 milli-ohm, is mounted in series with the switch 231. A voltage sensor 236 measures the voltage across the shunt resistor 235, this voltage reflecting the current at the output 172. The overcurrent condition is detected when the current at the output 172 is greater than a predetermined threshold, for example 30.7 amperes.

Yet another error condition may be a high-temperature condition detected when a temperature sensor 237 detects that a temperature of the dual-voltage AC/DC converter 200 exceeds a predetermined threshold. For example and without limitation, the temperature sensor 237 may detect a temperature of MOSFETs forming the switch 221 of the first DC/DC converter, the threshold being for example 145° C.

When one or more of the above-mentioned error conditions is reported to the switch controller 232, the switch controller 232 causes an opening of the switch 231. As a result, delivery of DC power from the first DC/DC converter 220 to the high-voltage load 170 is stopped. In an embodiment, the switch controller 232 may include an internal timer 238. In this embodiment, the switch controller 232 may cause the switch 231 to close again after a predetermined time period, for example after 3 or 4 seconds, following the detection of the error condition. If the error condition having caused the opening of the switch 231 is no longer present, the switch 231 may remain closed and power delivery to the high-voltage load 170 may resume. In the same or another embodiment, the switch controller 232 may implement a temperature hysteresis to maintain the high-temperature condition, once detected, until the temperature sensor 237 reports that the temperature has fallen below another, lower temperature threshold, for example 115° C. Still in the same or another embodiment, the switch controller 232 may implement a bulk voltage hysteresis to maintain the effect of the undervoltage condition unless the bulk voltage now exceeds another, higher predetermined threshold, for example 44.7V.

It may be noted that in the case of an undervoltage condition detected when the bulk voltage is lower than the predetermined threshold, stopping the delivery of power to the high-voltage load 170 allows to preserve as much as possible the available power at the output 222 of the first DC/DC converter 220 for powering the second DC/DC converter 240. In this manner, the delivery of DC power at the low nominal voltage to the EMS 160 via the power output 142 is prioritized over the delivery of DC power at the high nominal voltage to the high-voltage load 170.

Figure 6:
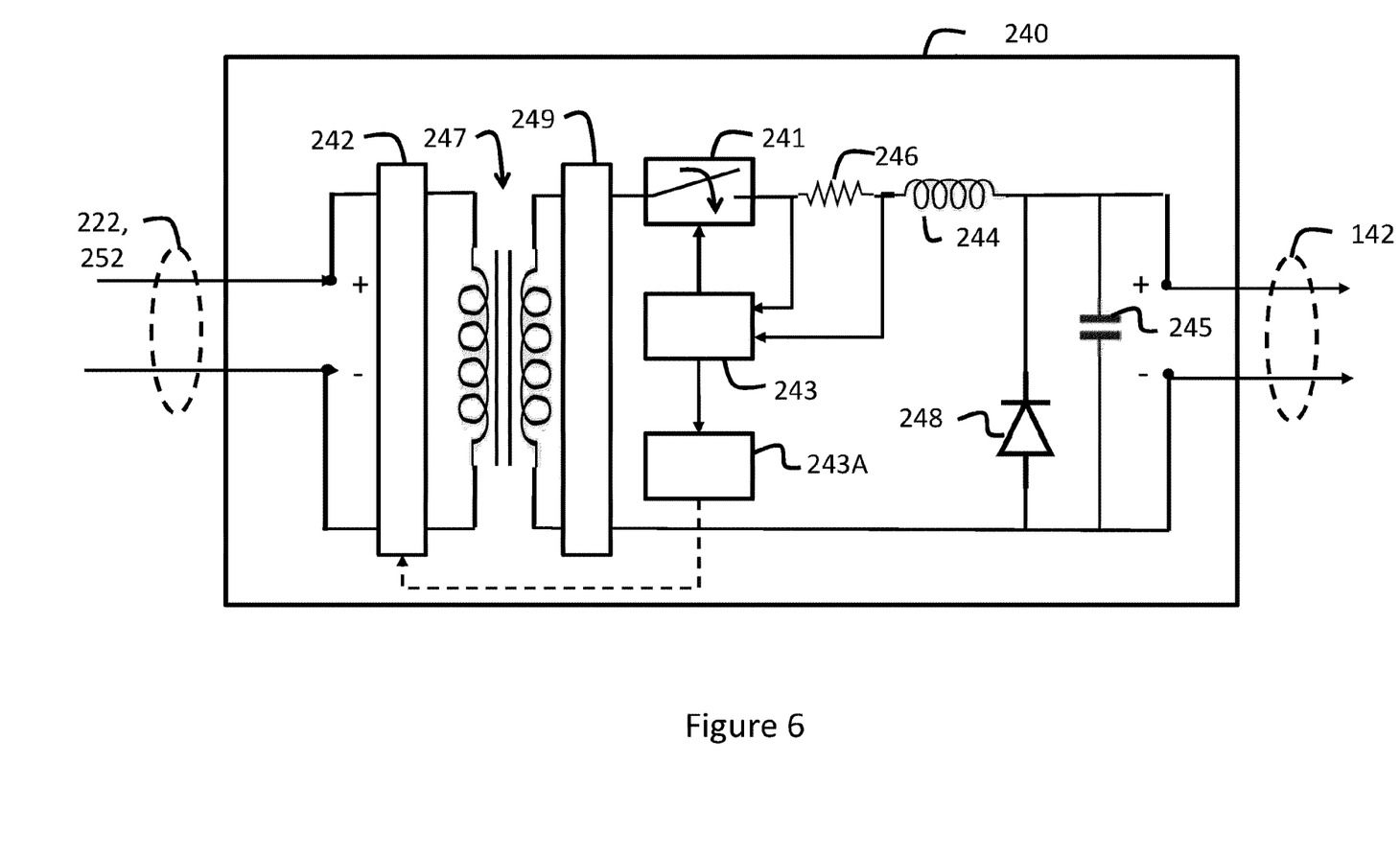
FIG. 6 is a block diagram of a second DC/DC converter of the AC/DC converter of FIG. 2 in accordance with an embodiment of the present technology.

FIG. 6 is a block diagram of the second DC/DC converter 240. In an embodiment, the second DC/DC converter 240 comprises several elements that are similar to those found in the first DC/DC converter 220. These elements include, for example, a switch 241, a shunt resistor 246, a controlling integrated circuit 243, an inductance 244, a capacitance 245 and a diode 248 that operate substantially in the same manner as do the switch 221, the shunt resistor 226, the controlling integrated circuit 223, the inductance 224, the capacitance 225 and the diode 228 of the first DC/DC converter 220.

The power output 142 of second DC/DC converter 240 is galvanically isolated from the first DC/DC converter 220 and from any high-voltage component of the electrical power system 100 of the aircraft in order to further protect the EMS 160 from eventual electrical faults occurring in the high-voltage load 170. To this end, the DC power received at the second DC/DC converter 240 from the output 222 of the first DC/DC converter, or the DC power 252 received from the start and backup input circuit 250, is fed to a high-frequency inverter 242 that converts the DC power to AC power. The high-frequency inverter 242 may operate in a frequency range, for example between 100 and 200 KHz, being controlled by an inverter controller 243A, for example a LM5045 Full-bridge PWM controller from Texas Instruments™ or any suitable equivalent thereof, the inverter controller 243A being itself controlled by the controlling integrated circuit 243. The AC power generated by the inverter 242 is applied to the primary side of a transformer 247. AC power at the secondary side of the transformer 247 is applied to a rectifier 249 that converts the AC power to DC power while preserving the galvanic isolation between the output of the rectifier 249 and the input of the second DC/DC converter 240. Although FIG. 6 shows that the switch 241 is positioned on the secondary side of the transformer 247, positioning the switch 241 on the primary side of the transformer 247, either before or after the inverter 242, is also contemplated.

The controlling integrated circuit 243 senses a DC voltage across the shunt resistor 246. The controlling integrated circuit 243 may cause a rapid opening and closing of the switch 241 and may also control the operation of the inverter 242 so that the DC voltage at the output 142 remains close to the operating voltage of 14V.

Figure 7:
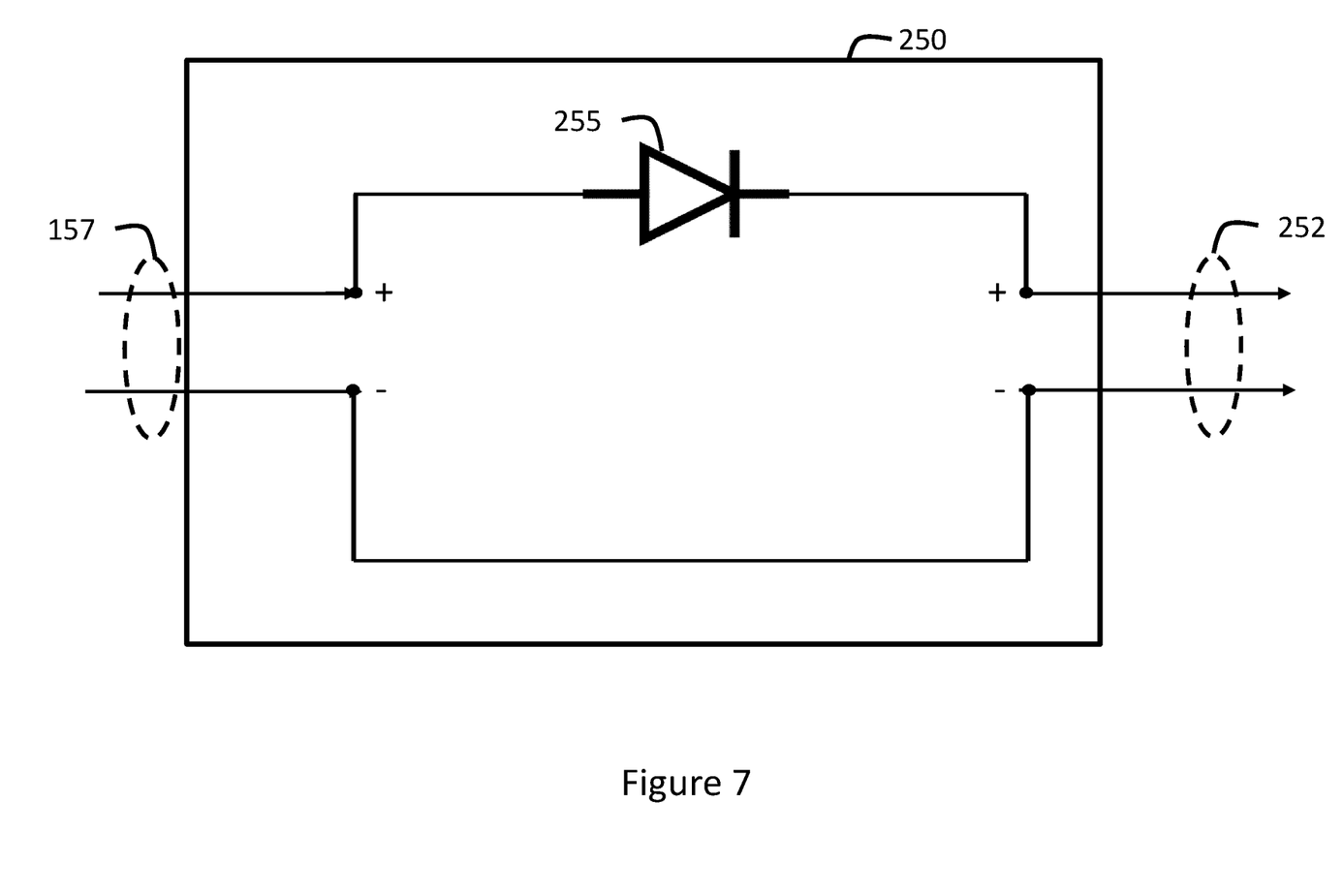
FIG. 7 is a block diagram of a start and backup input circuit of the AC/DC converter of FIG. 2 in accordance with an embodiment of the present technology.

FIG. 7 is a block diagram of the start and backup input circuit 250. In a simple embodiment, the start and backup input circuit 250 may comprise a single diode 255, for example and without limitation a MBRB40250TG Switch-mode power rectifier Schottky diodes from ON Semiconductor™ or any suitable equivalent diode. The diode 255 prevents DC power at the output 222 of the first DC/DC converter 220 from returning to the internal battery 155 via the power input 157. It may be noted that the internal battery 155 may be part of the high-voltage load 170 and may be recharged by the dual-voltage AC/DC converter 200. However, DC power flows from the power output 142 of the dual-voltage AC/DC converter 200 under control of the protection circuit 230. A flow of DC power from the output 222 of the first DC/DC converter 220 toward the battery 155 is not prevented by the protection circuit 230, but is prevented by the diode 255.

Figure 8:
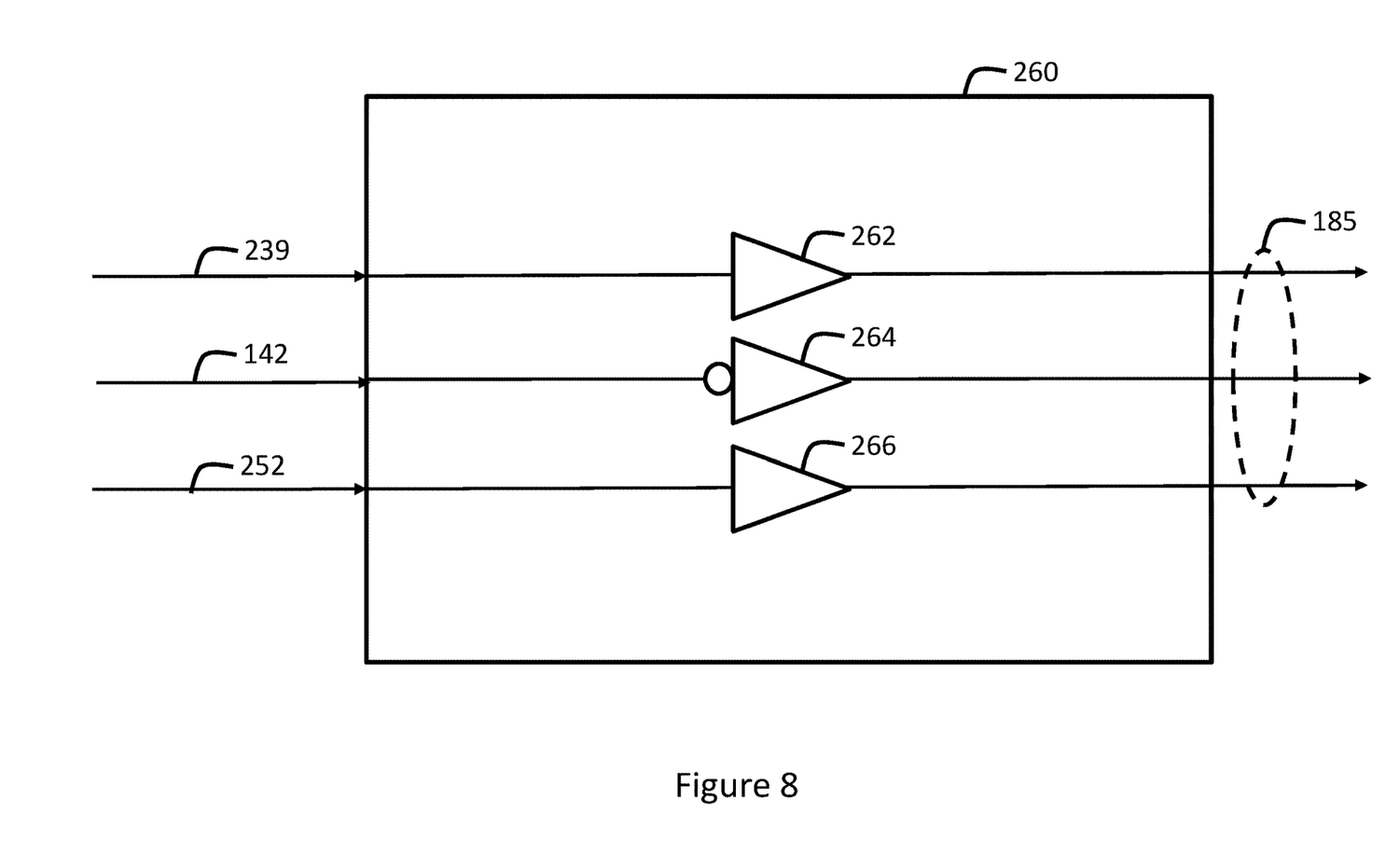
FIG. 8 is a block diagram of a monitoring circuit of the AC/DC converter of FIG. 2 in accordance with an embodiment of the present technology.

FIG. 8 is a block diagram of the monitoring circuit 260. In an embodiment, the monitoring circuit comprises three amplifier buffers 262, 264 and 266. The error signal 239 from the protection circuit 230 may report that the high voltage DC power is not available at the power output 172. If so, the amplifier buffer 262 forwards a signal on the signalling output 185. The monitoring circuit 260 is also connected to the power output 142. The amplifier buffer 264 generates a signal that is an inverse of a status of the power output 142. The amplifier buffer 264 forwards a signal on the signalling output 185 if DC power at the low nominal DC voltage (or 14V) is not available. In an embodiment, the amplifier buffer 264 may be replaced with a voltage detector providing a signal on the signalling output 185 if the voltage at the power output 142 is outside of a safe range, for example being less than 11.9V or greater than 14.5V. The monitoring circuit 260 also senses the backup DC power 252. The amplifier buffer 266 forwards a signal on the signalling output 185 when 24V backup DC power is used by the AC/DC converter 200.

In the electrical power system 100, the indicators 180 may separately receive the various signals on the signalling output 185 to independently provide warnings, for example by turning on warning lights indicating that the high-voltage DC power is unavailable, that the low-voltage DC power is unavailable, or that the AC/DC converter 200 is being fed by the 24V backup DC power from the internal battery 155. It is contemplated that the various signals received on the signalling output 185 of the monitoring circuit 260 may be used to generate other types of warnings, including for example audible alarms and/or displays on an instrument cluster (not shown).

Figure 9:
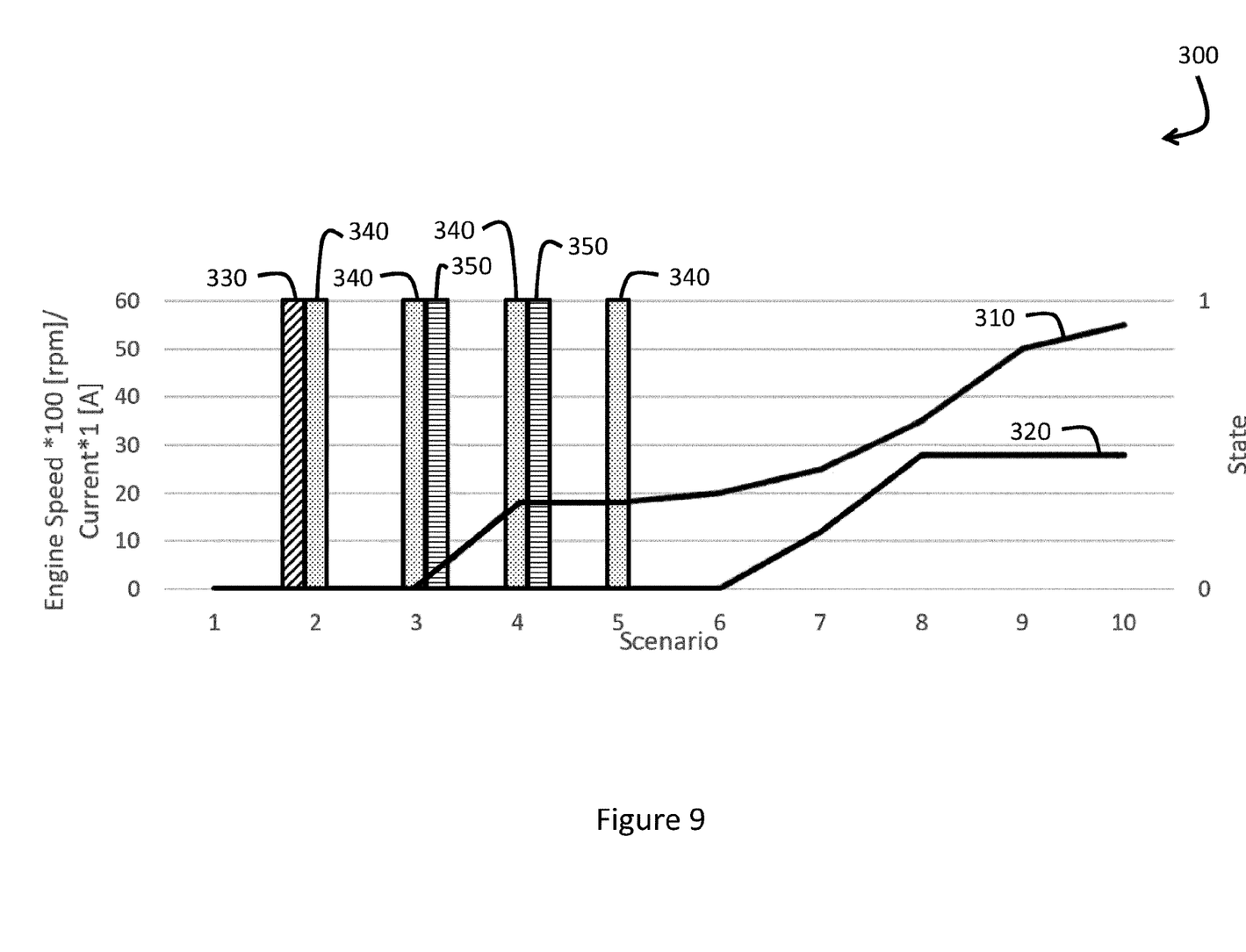
FIG. 9 is a timing diagram showing the behaviour of the dual-voltage AC/DC of FIG. 2 and of its components at start-up of the aircraft engine in accordance with an embodiment of the present technology.

FIG. 9 is a timing diagram showing variations over time of the high-voltage DC current delivered from the power output 172 and variations of the various indications present on the signalling output 185 over time, as a function of engine speed following start-up. On FIG. 9, a horizontal axis illustrates a timing sequence as a suite of 10 subsequent scenarios. Vertical axes reflect the engine speed in revolutions per minute (RPM), the high-voltage DC current, and ON/OFF status of each of the indications on the signalling output 185.

Table I summarizes the 10 scenarios illustrated on FIG. 9.

TABLE I

| Scenario | 1 | 2 | 3 | 4 | 5 | 6 | 7 | 8 | 9 | 10 |
|---|---|---|---|---|---|---|---|---|---|---|
| Max. current [A] of the Power Output 172 | 0 | 0 | 0 | 0 | 0 | 0 | 12 | 27.9 | 27.9 | 27.9 |
| Engine Speed x100 [RPM] | 0 | 0 | 0 | 18 | 18 | 20 | 25 | 35 | 50 | 55 |
| Power output 142 Unavailable State | 0 | 1 | 0 | 0 | 0 | 0 | 0 | 0 | 0 | 0 |
| Power output 172 Unavailable State | 0 | 1 | 1 | 1 | 1 | 0 | 0 | 0 | 0 | 0 |
| Start and Backup Input Circuit 250 State | 0 | 0 | 1 | 1 | 0 | 0 | 0 | 0 | 0 | 0 |
| Main Switch | OFF | ON | ON | ON | ON | ON | ON | ON | ON | ON |
| Engine Status | OFF | OFF | OFF | ON | ON | ON | ON | ON | ON | ON |

The 10 scenarios illustrated in FIG. 9 and in Table I may be summarized as follows:

Scenario 1: The main switch of the aircraft is in the OFF position. The aircraft engine is stopped and the electrical power system 100 of the aircraft is inactive. The engine speed (line 310) is 0 RPM and there is no current (line 320) delivered from the power output 172.

Scenario 2: The main switch is placed in the ON position. The group of indicators 180 provides a low-voltage power unavailable indication 330 because the low-voltage power is unavailable and a high-voltage power unavailable indication 340 because the high-voltage power is also unavailable. These indications may cause turning ON of corresponding warning lights (not shown) part of the group of indicators 180.

Scenario 3: Power is delivered from the internal battery 155 to the start and backup input circuit 250. A backup power indication 350 is provided to the group of indicators 180, for example causing turning ON of another warning light. The low-voltage power from the internal battery 155 becomes available at the power output 142 and the low-voltage power unavailable indication 330 disappears. The high-voltage power is still unavailable at the power output 172 and the high-voltage power unavailable indication 340 is still active.

Scenario 4: The aircraft engine 50 is started using the lower-voltage power from the power output 142 applied to the EMS 160, provided that internal checks of the ECU are successful. The aircraft engine 50 reaches an idle speed.

Scenario 5: While the aircraft engine 50 is idling, the AC/DC converter 200 starts outputting low-voltage power at the output 142. Power is no longer delivered from the internal battery 155 to the start and backup input circuit 250 and the backup power indication 350 disappears. The engine speed 310 aircraft engine 50 is still not sufficient for the AC/DC converter 200 to output high-voltage power at the power output 172, so the high-voltage power unavailable indication 340 is still active.

Scenario 6: As the engine speed 310 increases, the high-voltage becomes present at the power output 172 and the high-voltage power unavailable indication 340 disappears. The current 320 flowing from the power output 172 will start increasing with the engine speed 310.

Scenarios 7 to 10: As the engine speed 310 increases, the bulk voltage applied to the first DC/DC converter 220 also increases. Its power delivery capacity also increases. The current 320 increases up to a maximum rated capacity, as shown by a plateau of the current 320 in scenarios 8, 9 and 10.

The aircraft engine 50 is fully started and operational, ready for take-off of the aircraft, after scenario 10. At any time thereafter, one of more of the above-described error conditions may occur, potentially leading to the issuance of one or more of the indications 330, 340 and/or 350.

Table II provides a non-limiting example of power capabilities of the AC/DC converter 200 as a function of the speed of the aircraft engine 50.

TABLE II

| 14 V power at the power output 142 | 200 W @ 1600 RPM |
| --- | --- |
| | 200 W @ 2500 RPM |
| | 250 W @ 4000 PRM |
| 28 V power at the power output 172 (when 14 V power is provided by the single-voltage AC/DC converter 130) | 500 W @ 2500 RPM |
| | 800 W @ 4000 RPM |
| 28 V power at the power output 172 (when 14 V power is provided by the dual-voltage AC/DC converter 200) | 300 W @ 2500 RPM |
| | 550 W @ 4000 RPM |

Modifications and improvements to the above-described embodiments of the present technology may become apparent to those skilled in the art. The foregoing description is intended to be exemplary rather than limiting. The scope of the present technology is therefore intended to be limited solely by the scope of the appended claims.

What is claimed is:

1. A power supply for use in an aircraft, comprising:
   a DC power source adapted for providing DC power at a variable bulk voltage;
   a first DC/DC converter adapted for converting the DC power from the DC power source to DC power at a high voltage suitable for powering a high-voltage load;
   a second DC/DC converter adapted for receiving DC power from the first DC/DC converter, for converting the received DC power to DC power at a low voltage and for delivering the DC power at the low voltage to a low-voltage load, the low voltage being lower than the high voltage; and a protection circuit adapted for selectively transferring DC power from the first DC/DC converter to the high-voltage load;

wherein the first DC/DC converter is further adapted for converting the DC power from the DC power source to DC power at the high voltage when the variable bulk voltage is at least equal to the high voltage, the output of the first DC/DC converter being equal to the variable bulk voltage when the variable bulk voltage is lower than the high voltage.

2. The power supply of claim 1, wherein the protection circuit is further adapted for preventing transfer of the DC power from the first DC/DC converter to the high-voltage load in response to an error condition selected from an undervoltage of the DC power source, an overvoltage at an output of the first DC/DC converter, an overcurrent in the protection circuit, a high-temperature condition, and a combination thereof.

3. The power supply of claim 2, further comprising a monitoring circuit operatively connected to the protection circuit, the monitoring circuit being configured for outputting a high-voltage power unavailable indication in response to the error condition.

4. The power supply of claim 3, wherein:

the monitoring circuit is further operatively connected to the second DC/DC converter; and the monitoring circuit is further configured for detecting that the DC power at the low voltage is unavailable and, in response thereto, outputting a low-voltage power unavailable indication.

5. The power supply of claim 1, further comprising a start and backup input circuit adapted for receiving DC power from a backup source; and wherein:

the second DC/DC converter is further adapted for converting DC power received from the backup source via the start and backup input circuit to DC power at the low voltage; and the protection circuit is further adapted for receiving DC power from the backup source via the start and backup input circuit and for selectively delivering the DC power from the backup source to the high-voltage load.

6. The power supply of claim 5, further comprising a monitoring circuit operatively connected to the start and backup input circuit, the monitoring circuit being adapted for outputting a backup power indication in response DC power being received from the backup source.

7. The power supply of claim 5, wherein the start and backup input circuit comprises a diode adapted for preventing a return of DC power from the first DC/DC converter to the backup source.

8. The power supply of claim 1, wherein:

the protection circuit comprises one or more sensors selected from:
  a temperature sensor adapted for measuring a temperature of the power supply,
  a first voltage sensor adapted for measuring a voltage provided by the DC power source,
  a second voltage sensor adapted for measuring a voltage provided by the first DC/DC converter, and
  a current sensor adapted for measuring a current output by the protection circuit; and the protection circuit further comprises:
  a switch adapted for selectively transferring the DC power from the first DC/DC converter to the high-voltage load, and
  a switch controller, operatively connected to the one or more sensors, the switch controller being adapted for declaring an error condition based on one or more signals from the one or more sensors and for causing opening of the switch in response to declaring the error condition;

wherein the error condition is selected from:
  a temperature error condition declared in response to the temperature of the power supply exceeding a high-temperature threshold,
  an overvoltage error condition declared in response to the voltage provided by the first DC/DC converter exceeding an overvoltage threshold,
  an undervoltage error condition declared in response to the voltage provided by the DC power source being less than an undervoltage threshold,
  an overcurrent error condition declared in response to the current output by the protection circuit exceeding a high-current threshold, and
  a combination thereof.

9. The power supply of claim 8, wherein the protection circuit comprises an internal timer adapted for selectively resetting the error condition at a predetermined time after occurrence of the error condition.

10. The power supply of claim 9, wherein, in response to the error condition being the undervoltage error condition, the protection circuit resets the undervoltage error condition in response to the voltage provided by the DC power source being greater than or equal to an undervoltage reset threshold greater than the undervoltage threshold at the predetermined time after the occurrence of the error condition.

11. The power supply of claim 9, wherein, in response to the error condition being the temperature error condition, the monitoring circuits resets the temperature error condition in response to the temperature of the power supply being less than or equal to a temperature reset threshold lower than the high-temperature threshold at the predetermined time after the occurrence of the error condition.

12. The power supply of claim 1, wherein the second DC/DC converter comprises a galvanic isolation.

13. The power supply of claim 12, wherein the second DC/DC converter comprises:

an internal DC/AC converter adapted for receiving the DC power from the first DC/DC converter and for converting the received DC power to high-frequency AC power;

an internal AC/DC converter adapted for converting the high-frequency AC power to the DC power at the low voltage and for delivering the DC power at the low voltage to the low-voltage load; and an internal transformer adapted for transferring the AC power from the internal DC/AC converter to the internal AC/DC converter.

14. The power supply of claim 13, wherein the internal DC/AC converter comprises an inverter operating at a frequency in a range between 100 and 200 KHz.

15. The power supply of claim 1, wherein each of the first and second DC/DC converters is a switching regulator.

16. The power supply of claim 1, wherein the DC power source is a main AC/DC converter internal to the power supply, the main AC/DC converter having an input adapted for receiving AC power from an external power source and an output adapted for delivering the DC power at the variable bulk voltage to the first DC/DC converter.

17. The power supply of claim 16, wherein the main AC/DC converter is a bridge rectifier adapted for receiving a multiphase AC power from the external power source.

18. The power supply of claim 16, wherein the AC power is received from the external power source at a variable voltage.

19. The power supply of claim 16, wherein the main AC/DC converter is adapted for receiving the AC power from a generator driven by an aircraft engine.

20. The power supply of claim 19, wherein:
- the second DC/DC converter is adapted for providing power to an engine management system of the aircraft engine, the engine management system being part of the low-voltage load; and
- the first DC/DC converter is adapted for providing power aircraft electrical systems being part of the high-voltage load.

* * * * *